(12) United States Patent
Garlow et al.

(10) Patent No.: US 7,735,632 B1
(45) Date of Patent: Jun. 15, 2010

(54) PASS-THROUGH COVER/SEAL

(75) Inventors: Dave Garlow, Setauket, NY (US); Alfred Santacapita, Port Jeff Station, NY (US)

(73) Assignee: Anorad Corporation, Shirley, NY (US)

( * ) Notice: Subject to any disclaimer, the term of this patent is extended or adjusted under 35 U.S.C. 154(b) by 1108 days.

(21) Appl. No.: 11/395,800

(22) Filed: Mar. 31, 2006

(51) Int. Cl.
B65G 25/04 (2006.01)

(52) U.S. Cl. .............. 198/750.3; 198/750.1; 198/468.9; 198/860.3

(58) Field of Classification Search ............ 198/468.01, 198/468.9, 750.3, 805, 860.3, 860.5
See application file for complete search history.

(56) References Cited

U.S. PATENT DOCUMENTS

| | | | | |
|---|---|---|---|---|
| 4,681,506 A | * | 7/1987 | Teramachi | ............... 198/468.9 |
| 5,320,214 A | * | 6/1994 | Kordis | ..................... 198/750.1 |
| 6,308,821 B1 | * | 10/2001 | Asai et al. | ................ 198/750.7 |
| 6,520,320 B1 | * | 2/2003 | Wang et al. | .............. 198/750.7 |
| 6,662,934 B1 | * | 12/2003 | Iida | .......................... 198/750.1 |
| 6,766,897 B2 | * | 7/2004 | Kuwabara | ................ 198/750.1 |
| 6,899,511 B2 | * | 5/2005 | Gurevich et al. | ......... 198/468.9 |

* cited by examiner

*Primary Examiner*—James R Bidwell
(74) *Attorney, Agent, or Firm*—Turocy & Watson LLP; R. Scott Speroff; John M. Miller

(57) ABSTRACT

A system and method for mounting the strip seal on the side of a pass-through positioning stage. The strip seal can effectively provide support to a cover of the stage and be magnetically coupled to the cover and base for an enhanced seal and added support. Accordingly, the tendency for the stage to sag and vibrate during operation is mitigated. Moreover, a side-mounted strip seal is exposed to a reduced amount of debris that accumulates on the top of a stag, and thus is less susceptible to contaminants entering the interior of the stage. As such, and in connection with a variety of other means for reducing contamination, the stage can operate for longer periods of time without wear and/or maintenance, etc.

35 Claims, 10 Drawing Sheets

PASS-THROUGH COVER/SEAL

TECHNICAL FIELD

The subject invention generally relates to a novel positioning stage. More particularly, the invention relates to a system and/or methodology that facilitates a side-mounted strip seal on a positioning stage in order to mitigate sagging and/or vibration as well as to reduce contaminants within the stage.

BACKGROUND OF THE INVENTION

Positioning stages are motor-driven machines, typically with linear travels, that can be employed to, e.g., to move goods/products. Positioning stages are employed in industry to move a carriage or slide in a direction along a path in connection with a variety of applications. For example, a good can be placed upon the slide at an initial position, after which the slide can be moved to a next position (or positions) where some work or activity is performed on the good, and, finally, the slide can be moved to a final position of the stage where the good can be removed from the slide. The slide can then return to the initial position and the process can be repeated. In this example, the good can enter as an unfinished good and leave the stage as a finished good. At the next position(s), the work performed can be completed by a machine that requires a relatively precise location of the good.

Accordingly, positioning stages can be used in a variety of different environments depending on the application. Although the variety of different environments can differ in many ways, one thing that is virtually universal is that the positioning stage will be exposed to many forms of contaminants. For example, the positioning stages can be employed in connection with a box folding plant that produces substantial by-product dust and debris from the boxes; a factory handling glass or glass panels wherein breakage is often inevitable creating shards and highly abrasive particles; to laser trimming/etching, wafer drilling, etc. wherein contaminants are certain to be created as a result of the work activity.

Also depending upon the application, the positioning stage may be required to operate within certain ranges of speed, precision, and lengths of travel. However, the numerous types of contaminants present can infiltrate the stage and cause potential wear and damage as well as interfering with the speed and precision expected. Therefore, protection of the internal components of a positioning stage can become a critical requirement in applications with any kind of contamination, and can present substantial design challenges for the stage designer. Positioning stages can have, e.g., mechanical, optical, magnetic and electrical components in their interior, none of which may operate well or very long in contaminated environments. In addition, many of these contaminants can be very abrasive, compounding the wear and erosion of the stage and/or its internal components.

In an effort to protect stages, many conventional systems employ a cover or cover plate that that shields the internal components from falling debris. However, since the slide that moves the product must be accessible above the cover while the mechanisms that move the slide must be below the cover to be protected, conventional systems inevitably lead to holes in the protection afforded by a cover plate. Today, a number of protection schemes are commonly used on positioning stages, such as collapsible bellows, metal strip seals, and re-circulating belts. While each of these schemes can provide some advantages, there are drawbacks for each scheme as well.

Protective bellows are relatively simple to implement and are perhaps the most widespread, but bellows are a very expensive protection scheme and are less effective with airborne contamination and/or small contaminants. Metal strip seals offer better protection from particles of all sizes, but conventional designs have the seals on the top of the stage, which suffers from debris accumulation on the seals, and typically requires a higher level of maintenance. Re-circulating belts are unsuitable for some environments, (especially wet environments where bellows and strip seals are vastly superior) and get succeeding less effective as the particle size decrease.

Moreover, certain materials have been demonstrated to be capable of collecting or capturing contaminants before they can enter the inside of a stage, yet conventional positioning stages do not make use of these materials. Further, in addition to the difficulties presented by contaminants, the existing protection schemes also suffer from other deficiencies in their design. For example, conventional positioning stages are particularly susceptible to vibration, especially at higher speeds, and sagging of the central members of the stage, such as the cover plate and/or the strip seals. Both of these difficulties can arise due to a lack of support and/or a lack of an effective means of coupling to more stable components.

In view of at least the above, there exists a strong need in the art for a system and/or methodology that can facilitate a reduction of contaminants that can harm the internal components of a positioning stage, support the central members, and/or reduce the vibrations.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The claimed subject matter can facilitate improved performance, efficiency and operating life for a positioning stage, as well as reduce potential maintenance and/or upkeep. For example, by mitigating the introduction into the interior region of contaminants that can cause abrasion, wear, etc. to the internal components of the stage. Additionally, the claimed subject matter can mitigate a tendency of central members of a positioning stage to sag and/or vibrate.

To the accomplishment of the foregoing, in a positioning stage with a pass-through strip seal, the strip seal can be mounted on the side of the stage. This aspect of the claimed subject matter can provide a number of advantages vis-à-vis conventional stages that have the strip seal on the top of the stage—a location where contaminants are more likely to accumulate. Moreover, since the strip seal can be fabricated out of a material that is flexible in the axial direction (e.g., to allow the strip seal to bend around the contours of a slide as the slide passes through), but very rigid in the lateral direction, a side-mounted strip seal, can provide the additional advantage of supporting the cover of the stage. For example, the strip seal can rest upon a ledge of the base of the stage and support the cover. In this manner the cover can be supported throughout the entire length of the stage, whereas conventional stages generally only support the cover at the end mounts which forces the stages to be extremely narrow and/or short or there will be a tendency for the central members of the stage to droop or sag.

In accordance with an aspect of the claimed subject matter, the strip seal can be coupled to the base and the cover to enhance the seal integrity, add to the support of the cover and reduce vibrations that tends to occur and which can cause damage and/or wear to the components, especially when the slide travels at higher speeds. The coupling is typically a magnetic coupling, but other types of coupling are contemplated and are intended to be within the spirit and scope of the claimed subject matter.

In accordance with an aspect, the friction involved when the slide moves and/or the strip seal passes through the slide can be mitigated by employing very low-friction materials as well as employing low-friction rollers in at least one of the slide or a strip guide. These or other rollers can also help lift the strip seal away from the cover and base as well as re-couple the strip seal to the cover and base plate as the slide passes through.

In accordance with an aspect of the claimed subject matter, exposure of the internal components of the stage to contaminants can be further reduced by pumping air into the stage such that an outwardly flowing air current is created at any aperture where potential contaminants might otherwise be able to enter the stage. Additionally or alternatively, such apertures can be lined with materials the can capture and/or attract and collect the potential contaminants. For example, a fibrous material can be used or an electrostatic material.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
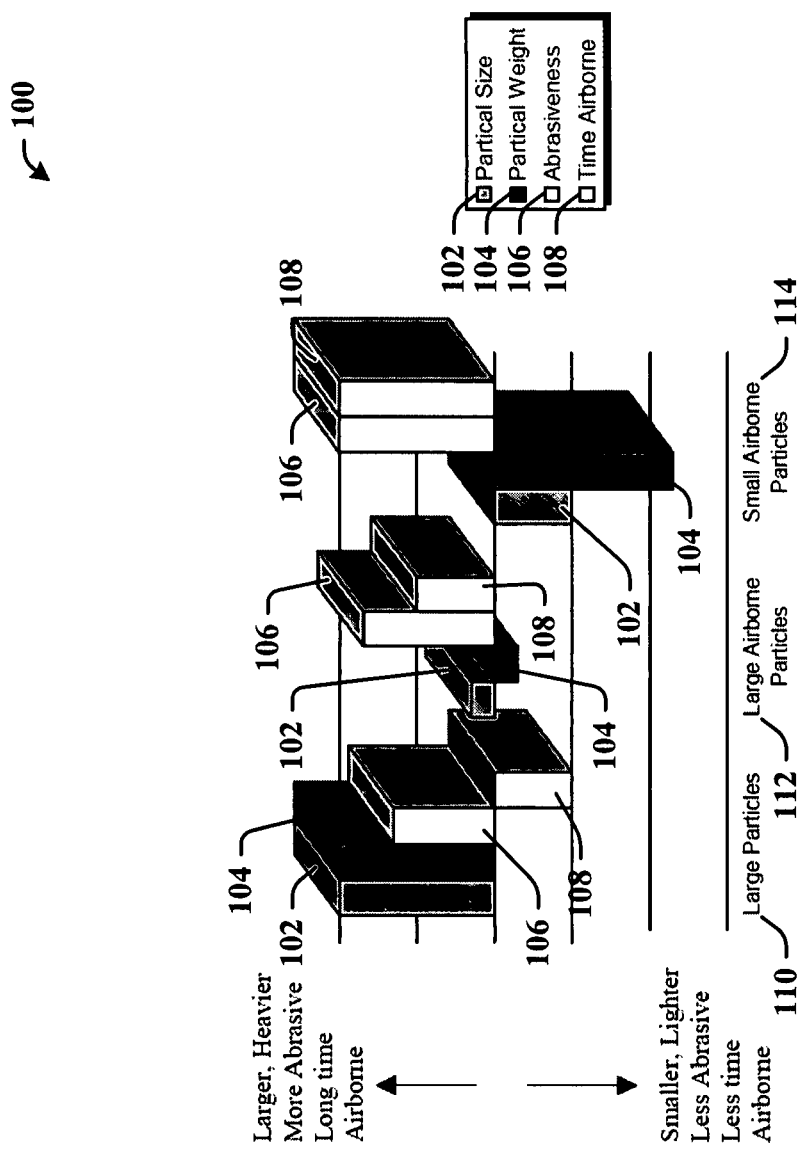
FIG. 1 is an exemplary comparison chart of various characteristics of potential contaminants that can contaminate a positioning stage.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Referring now to the drawings, FIG. 1 is an exemplary comparison chart 100 of various characteristics of potential contaminants that can contaminate a positioning stage. Generally, contamination and/or contaminants can be broken down into four broad categories based on particle size 102, weight 104, abrasiveness 106 and method of transport, e.g., airborne or carried by a liquid. The chart 100 also depicts a time airborne 108 for a non-liquid contaminant.

Large particles 110 are typically not abrasive, but can obstruct the travel of a positioning stage and can be produced in large volumes. These particles are generally larger than 2 millimeters (mm) and can have an average weight greater than 10 grams. Large particle 110 contaminants are often found to be in abundance in particular environments such as machining applications of, e.g., wood, metal, plastic and the like. Large metal particles 110, for instance, can have edges sharp enough to cut through many kinds of non-metallic materials.

Large airborne particles 112 can range in size from 25 microns to 2 mm and can weigh between 1 milligram (mg) and 10 grams. Particles in this category (e.g., large airborne particles 112) can become airborne for relatively short periods of time 108. Large airborne particles 112 and can be produced typically by, e.g., laser etching, metal grinding and metal machining. Particles 112 can have varying levels of abrasiveness, and generally leave a thin film over the entire work area.

Small airborne particles 114 are usually less than 25 microns in size and of nearly infinitesimal weight. This type of particle 114 can stay airborne for extremely long periods of time 108, can move in unpredictable trajectories, and is small enough to work itself through many components of a positioning stage, such as barrier seals on encoders, ball screws and bearing systems. These types of particles 114 are typically silicate or ceramic in nature, and are often highly abrasive. Laser etching/trimming, grinding and/or drilling of, e.g., ceramic and silicon substrates as well as silicon wafer drilling can produce small airborne particles 114.

The last category is liquid-based corrosive contamination (not shown). This can include acids, water and coolants. Not only can these agents be corrosive, but they can also carry abrasive particles in stasis that can wreck havoc on positioning stages and/or components thereof. Machine tools and wet bench wafer processing are typical applications where this type of contamination can be present. As discussed supra, there are a number of protective schemes to mitigate the infection of positioning stages with contaminants. These conventional schemes are referenced in more detail below in connection with FIGS. 2-4.

Figure 2:
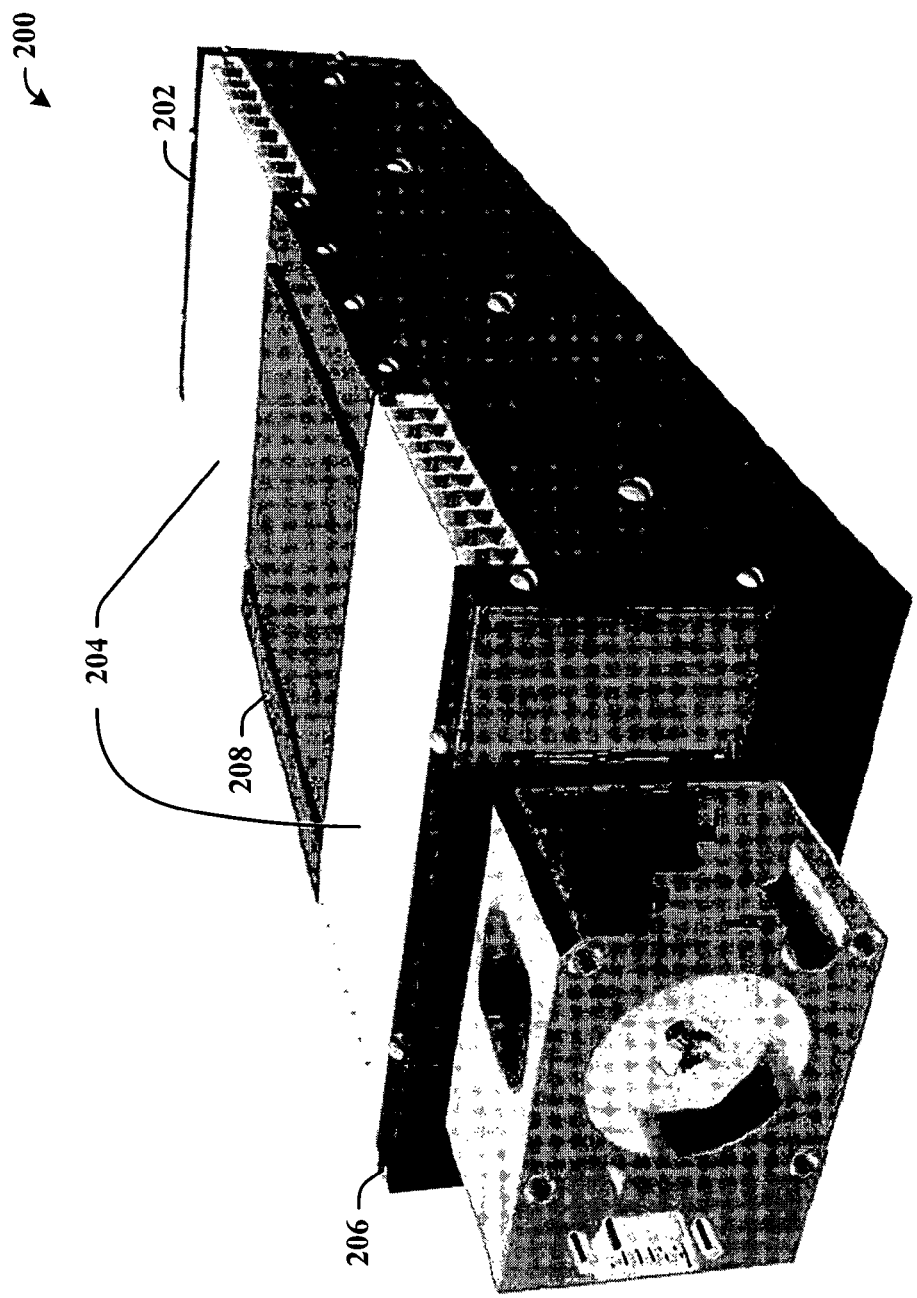
FIG. 2 is a graphic illustration of a prior art positioning stage that employs pleated bellows.

Turning now to FIG. 2, a prior art system 200 that illustrates an exemplary positioning stage 202 with bellows 204 is depicted. Typically, the bellows 204 are pleated and attach to the endplate 206 and the slide 208. Employing bellows 204 is a common technique to protect the positioning stage 202 from contaminants. The bellows 204 are typically made from vinyl or a similar material. The bellows 204 are pleated and are designed to expand and collapse depending on the position of the slide 208. Separate bellows are used on each side of the slide 208, and each bellow 204 is attached to both the slide 208 and endplate 206, typically by small screws or Velcro. As the slide 208 moves from one side of travel to the other, the bellows 204 collapse or expand to accommodate the position of the slide 208. That is, the bellows 204 collapse as the slide 208 moves over them, then the flaps of the bellows 204 return to vertical as the slide 208 retreats to another location.

Collapsible bellows 204 are generally the simplest to implement and are perhaps the most common type of protection found on linear positioning stages 202. Bellows 204 are expensive, however, and are not very effective at protecting from airborne contamination, especially from small particles. In addition, pressure differentials between each side of the slide 208 can draw in airborne contamination. Further, the bellow 204 pleats must be periodically cleaned to prevent large particles from collecting on the bellows 204, thus restricting collapse and/or slide travel or damaging the bellows 204. Moreover, a design engineer often must also allow for the lost travel as the bellows 204 collapse down.

Figure 3:
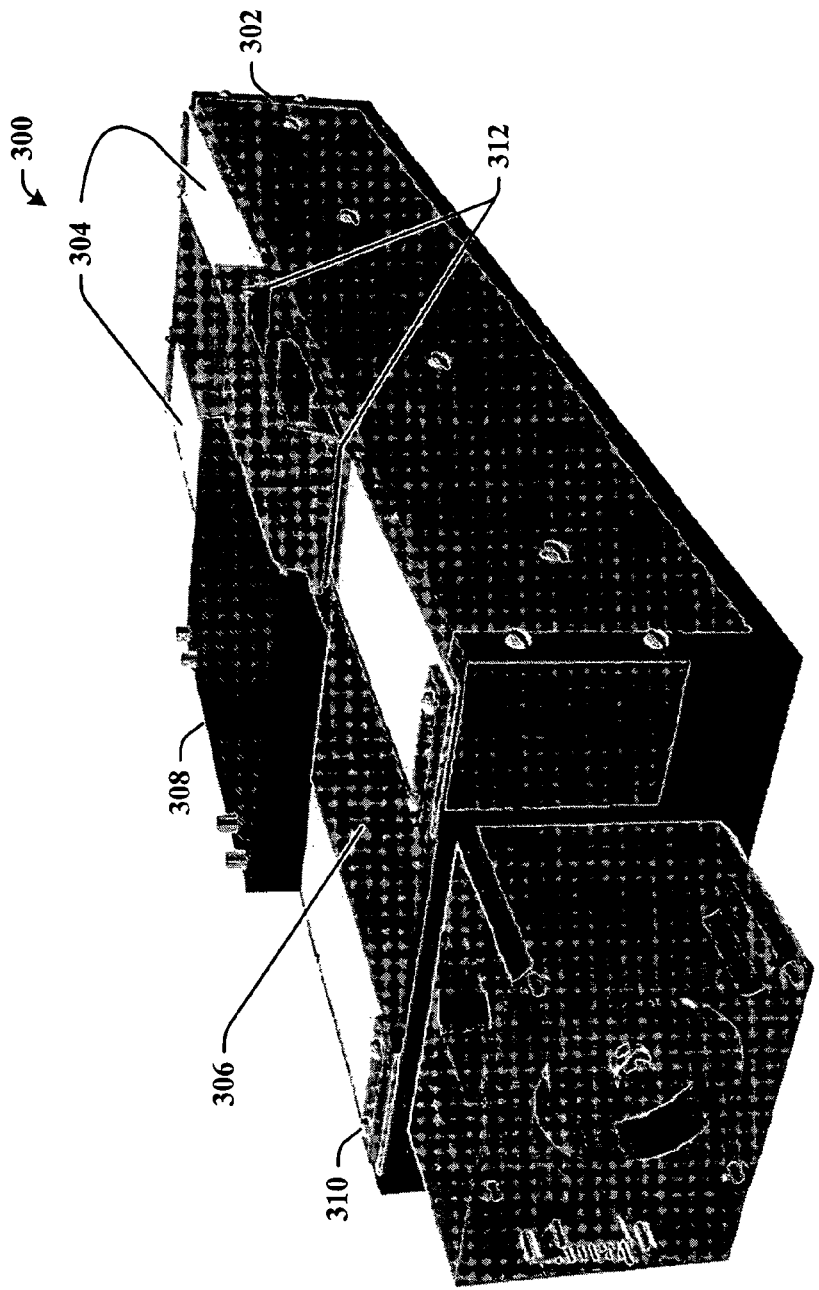
FIG. 3 is a graphic depiction of a prior art positioning stage that employs metal strip seals over the top of the stage.

Referring now to the drawings, FIG. 3, a prior art system 300 that illustrates an exemplary positioning stage 302 with metal strip seals 304 is depicted. Metal strip seals 304 operate much differently than bellows in order to keep out contaminants. As depicted, the stage 302 has two slots running down its length separated by a top plate 306. The slide 308 runs along each of these slots and underneath the top plate 306. The slide 308 also has two smaller slots down each side of its length. A thin, narrow piece of steel 304 is attached to both endplates 310 and passes through each slot in the slide 308. When the steel strip 304 approaches the slide 308, it is re-directed underneath the slide 308 by a pair of rollers 312, as can be seen where the upper portion of the slide 308 is invisible to show the rollers 312. Another set of rollers 312 on the opposite side of the slide 308 route the steel strip 304 in an inverse fashion, allowing the steel strip 304 to emerge on the opposite side of the slide 308. In an alternative embodiment, the stage 302 may not employ rollers 312, but instead have a surface upon which the strip seal 304 slides.

Metal strip seals 304 offer good protection from particles of all sizes, and are very compact and inexpensive. Strip seals 304, however, offer challenges for the designer of stages 302 requiring high throughput or high precision. Given the various forces exerted on the strip seal 304 in conventional systems, the outcome can lead to high friction forces, vibrations and sagging. Friction will have a negative impact on accuracy repeatability and resolution of the positioning stage 302. Some shortcomings of stages 302 that employ over the top metal strip seals 304 is that debris and other contaminants fall directly onto the metal strip seals 304 since they are on top of the stage 302. In addition, the central members of the stage 302 have a tendency to vibrate and sag, especially in stages 302 with long travels, and, often the stage must be constructed to be very narrow and/or very short, limiting, somewhat the available applications.

Figure 4:
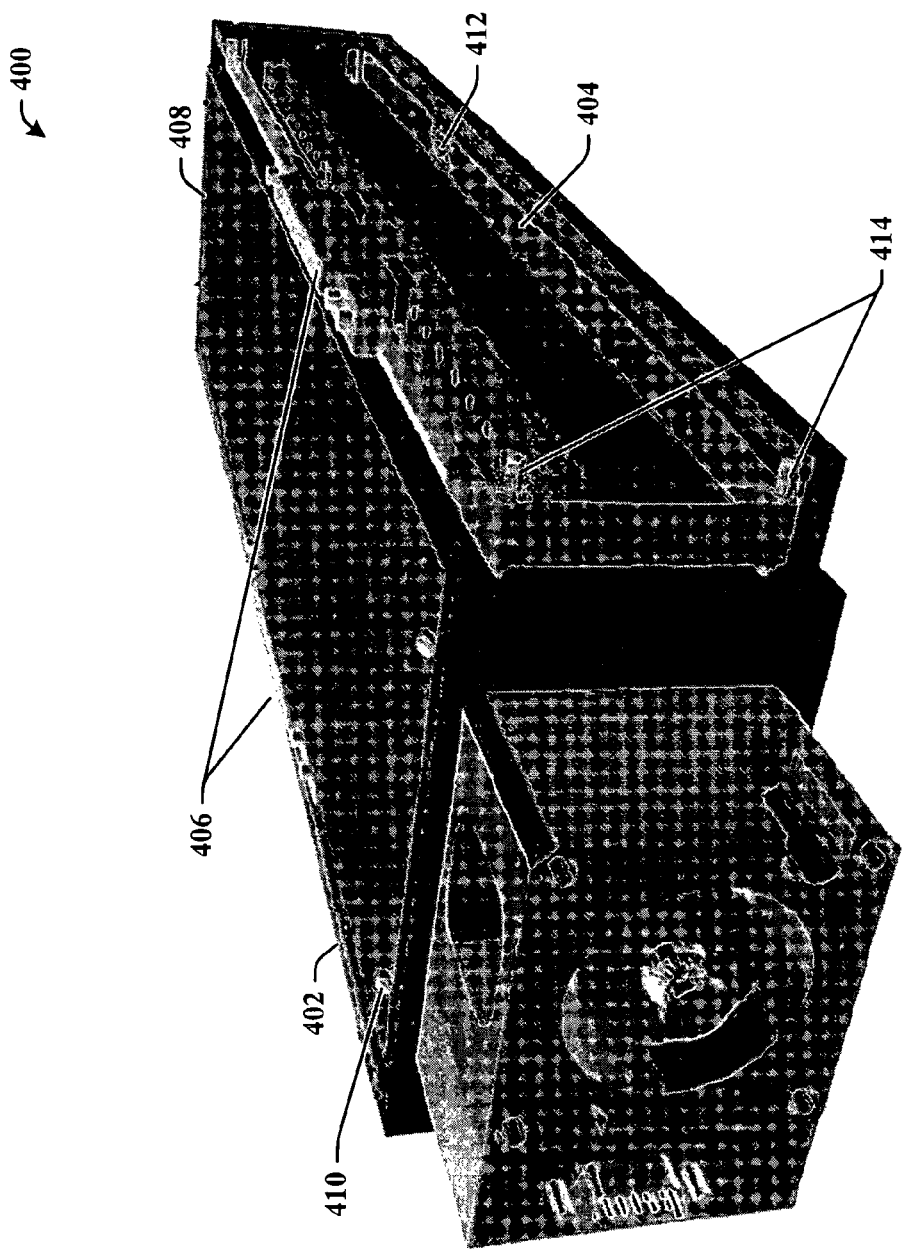
FIG. 4 is a graphic illustration of a prior art positioning stage that employs re-circulating belts.

Turning now to FIG. 4, a prior art system 400 that illustrates an exemplary positioning stage 402 with a circulating belt 404 is depicted. Re-circulating belt 404 protection systems are similar to metal strip seals. The slide 406 has approximately the same U shape, the bottom of which runs under the top plate 408, and the positioning stage 402 has slots running down its length as well (although the slots are typically much narrower than in the metal strip seal system). Instead of being rigidly attached at the endplates 410, the belts 404 are attached to each side of the slide 406. Holes in the endplates 410 allow the belts 404 to re-circulate through the endplates 410 and emerge below the slide 406, but outside of the interior portion of the stage 402. Belts 404 from either side of the slide 406 are attached with a small spring 412 to retain constant tension. The belts 404 are typically polymer based and have a polyurethane coating. In addition, the side plates and top plate 408 have containment grooves to guide the belts 404 and create a labyrinth seal structure.

Re-circulating belts 404 are more pliable than a thin metal strip, and they can be turned around a small roller 414 with minimal friction. In addition, the belts 404 can be dynamically tensioned with a spring 412, eliminating the need for re-tensioning. The reduced friction can dramatically extend their life. A primary disadvantage of re-circulating belts 404 is the migration and accumulation of particles around the outer edges of the belts 404. In addition, re-circulating belts 404 are unsuitable for liquid contamination because liquids can wick around the belts 404, even in the presence of positive pressure.

Figure 5:
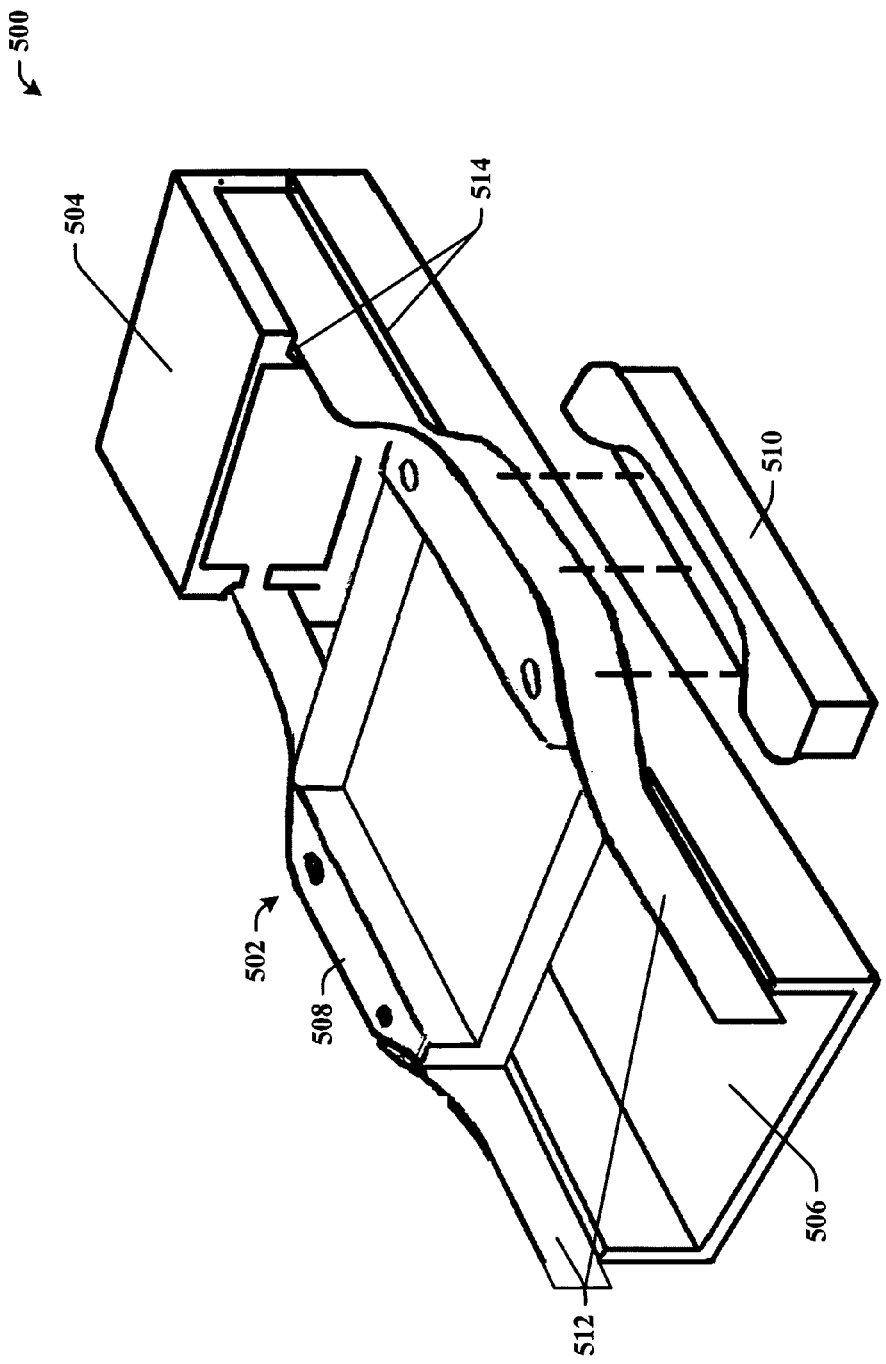
FIG. 5 shows a concept sketch that illustrates an exemplary system 500 that can mitigate a tendency of a positioning stage 502 to sag and/or vibrate and can reduce contaminant accumulation within the stage.

With reference now to FIG. 5, a concept sketch that illustrates an exemplary system 500 that can mitigate a tendency of a positioning stage 502 to sag and/or vibrate and can reduce contaminant accumulation within the stage. It is to be appreciated that the system 500 is intended to impart various concepts of the claimed subject matter rather than providing an exact construction schematic. According to an aspect of the claimed subject matter, the stage 502 can be a linear stage that operates to move a product (not shown) to a position along an axis of the stage. Generally, the system 500 can include a cover plate 504 that can cover a top portion of the stage 502; a base 506 that can be positioned at a bottom of the stage 502; a slide 508 optionally coupled to a strip guide 510 and a platform (not shown), the slide 508 can operate to move (e.g., move the platform which can be supporting a good) in a direction to position of the stage 502; and a strip seal 512 that can be mounted on a side of the stage 502 to facilitate a number of advantages over conventional systems.

The strip seal 512 can pass through the slide 508, for example, the strip seal 512 can pass between the slide 508 and the strip guide 510 at the location of the slide 508, but otherwise can remain in contact with the cover plate 504 and/or the base 506 at all other locations. To the accomplishment of the foregoing, the slide 508 and/or the strip guide 512 can operate to lift the strip seal 512 away from the cover plate 504 and/or base 506 at the point where these components intersect in the direction of travel of the slide 508. Likewise, at the reverse end of the slide 508, the strip seal 512 can be re-engaged with the cover plate 504 and/or base 506. It is to be appreciated that the slide 508 and/or the strip guide 510 can include low-friction rollers (not shown) that operate to lift and reconnect the strip seal 512 as the slide 508 translates from one location to another, or by way of a low-friction wedge.

Since the strip seal 512 can be mounted on the side of the stage 502, the strip seal 512 can maintain enhanced seal integrity from debris over conventional strip seals that are positioned on the top of a positioning stage, e.g., referring briefly back to the stage 302 in FIG. 3, because debris and/or contaminants are more likely to accumulate on the top of the stage 302 than on the sides. Contaminants that accumulate on the strip seals 304 are more likely to penetrate the interior regions, e.g., as the strip seal 304 passes through the slide 308, creating apertures or openings in the seal.

Moreover, referring again to FIG. 5, side-mounted strip seals 512 can rest on a horizontal ledge of the base 506 and can also support the cover plate 504, as indicated at the areas 514. The base 506 is generally very stable and the strip seal 512 can be constructed of a rigid material such that the strip seal 512 is extremely stiff in the vertical/lateral direction. Thus, the strip seal 512 can support central members of the stage 502 (e.g., the cover plate 504) at any point along the entire travel of the stage 502 rather than being supported merely at the ends as conventional systems typically do. Accordingly, the tendency of conventional systems to sag, especially evident in systems with lengthy travels, can be mitigated. For example, conventional systems tend to sag when the travel is as short as one meter or even less. By employing the strip seal 512 to support the central members of the stage 502, much longer travels can be realized without the presence of sagging. In essence, the length of the stage 502 and/or the travel need not be constrained by such short distances, but can be virtually unlimited in length.

Furthermore, the tendency of conventional systems to vibrate, especially when operating at higher speeds, can also be mitigated. To further reduce a tendency to vibrate, the strip seal 512 can be coupled to the cover plate 504 and/or the base 506. This aspect can be implemented by way of a magnetic coupling, an electrostatic coupling, a vacuum, an adhesive, etc. such that strip seal 512 can be easily separated from and re-coupled to the cover plate 504 and/or the base 506 as the strip seal 512 passes through the slide 508, e.g., when the slide 508 is moved along the travel path, e.g., during normal operation.

It is to be appreciated that although only partially depicted in the sketch, the cover plate 504 can extend the length of the stage 502. In addition, the cover plate 504 can be tapered or angled (not shown) along the lateral edges, where the cover plate 504 can rest upon the strip seal 512 in order to allow dust, debris, and/or potential contaminants to slide off of the cover plate 502. Moreover, the stage 502 can also include end plates (not shown) that can be mounted to the cover plate 504 and the base 506 (as well as the strip seal 512) to fully enclose an interior region of the stage 502, thereby protecting the internal components (e.g., a motor (not shown) that propels the slide 508 along the travel path, wiring, . . . ) of the stage 502 from potential contaminants, e.g., contaminants that typically exist and/or are produced in the surround environment. In accordance with one aspect, the enclosed stage 502 can employ an air pressure source (not shown) to induce or drive air or gas into the interior region, as well as an air pressure regulator (not shown). In accordance therewith, the interior region will tend to have a higher air pressure than the surrounding environment such that an air current can be created that flows out of the interior region at any existing apertures. This air current can prevent potential contaminants from entering the interior region of the stage 502 as well as reduce friction by creating a air pocket for the strip seal 512 to float on.

Additionally or alternatively, according to an aspect of the claimed subject matter, apertures or other potential points of entry for potential contaminants can be lined with a material that can capture those contaminants. For example, the material can be a fibrous material such as, e.g., felt, wool, and/or a synthetic that collects potential contaminants as well as an electrostatic material that can electrostatically attract the potential contaminants, especially small particles of very little mass (e.g., small airborne particles 114 of FIG. 1). According to one aspect, the felt (or other material) can act as a wiper to further reduce the ability of contaminants to enter the stage 502. The felt can also remove debris from the strip seal 512 and "sweep" it away from the active area of the product. Further, the felt can aid in reducing friction in connection with the strip seal 512. For instance, a felt "wiper" that sweeps up debris can also include a lubricant that acts to lubricate the strip seal 512 to further minimize friction.

In accordance therewith, additional protection of the internal components from contaminants can be provided. Moreover, these internal components can be wired (e.g., wires to convey power and/or control information) to provide access from outside of the stage 502 assembly. For example, a power and/or control box (not shown) can be mounted on the exterior of the stage 502; the wiring can be threaded through a small hole designed to limit contaminant access e.g., on the side plates or the bottom of the base 506; and/or the control can be provided by way of wireless communication.

Figure 6A:
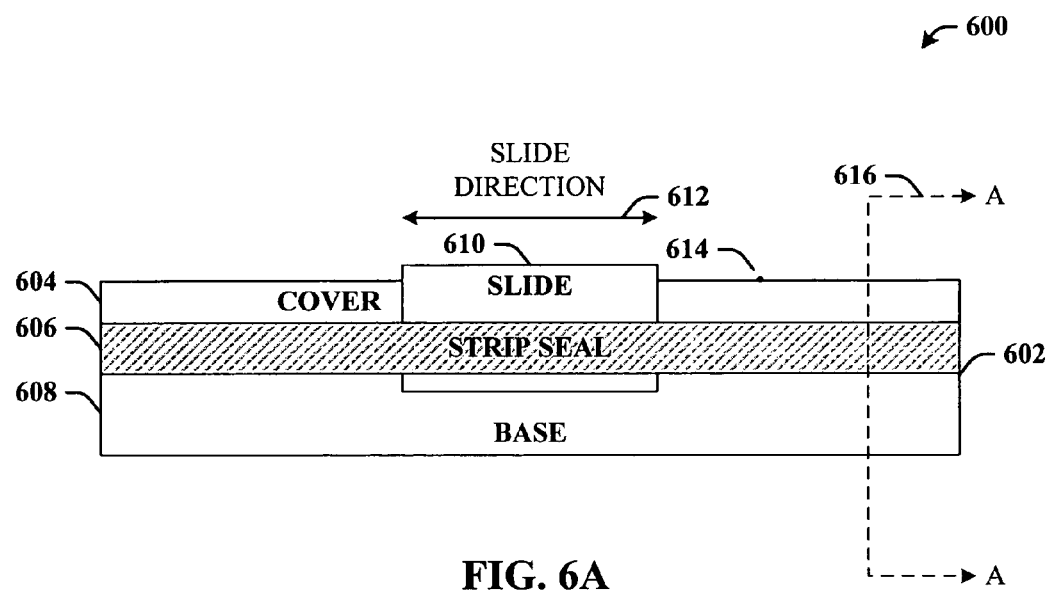
FIG. 6A a block diagram that depicts a side view of an exemplary system that can mitigate a tendency of a positioning stage to sag and/or vibrate can reduce contaminant accumulation within the stage.
Figure 6B:
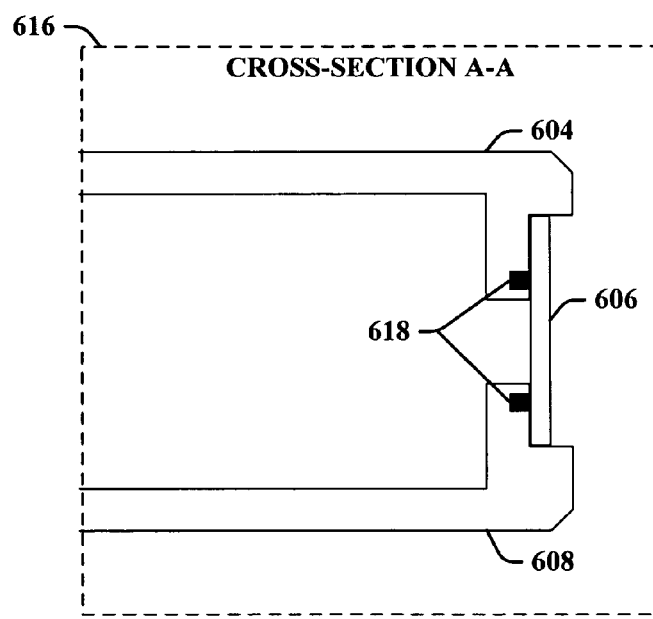
FIG. 6B a block diagram that depicts a cross-sectional view of an exemplary positioning stage and can facilitate a magnetic coupling between a strip seal and a cover/base of the stage.

Referring now to FIGS. 6A-6B, FIG. 6A displays a block diagram that depicts a side view of an exemplary system 600 that can mitigate a tendency of a positioning stage 602 to sag and/or vibrate and can reduce contaminant accumulation within the stage. FIG. 6B displays an associated cross-section of the stage 602 according to an aspect of the claimed subject matter. Generally, the system 600 can include a cover 604 that can cover the top portion of the stage 602 and can protect inner components of the stage 602 from dust, debris, and/or other potential contaminants. The system 600 can also include a strip seal 606 that can be located on the side of the stage 602 rather than on the top, as well as a base 608 and a slide 610. As illustrated, the strip seal 606 can be coupled to the cover 604 and base 606 over most of the length of the stage 602, but can run along the outside of the slide 610 as the slide 610 passes through. The slide 610 can move the length of the stage (e.g., propelled by a motor (not shown) that can be in the interior of the stage 602). Hence, for the purposes of illustration and not limitation, the slide 610 can move in a direction 612 to a position 614. Moreover, to better illustrate the described aspects, an exemplary cross-section 616 has been provided.

As previously detailed, the strip seal 606 can be a pass-through strip seal wherein the strip seal 606 is lifted away from and re-engaged with the cover 604 and/or base 608 as the slide 610 moves. For example, when the slide moves in direction 612 toward position 614, the front of the slide 610 can be designated as the end that is nearer to the position 614, while the back of the slide 610 can be designated as the rear that is farther from the position 614. In accordance therewith, when the slide 610 moves, the strip seal 606 is detached from the cover 604 and/or the base 608 at the front of the slide 610 and re-coupled at the rear of the slide 610. It is to be understood that rollers (not shown) can be employed to reduce friction, reduce vibrations and/or to facilitate the decoupling/re-coupling of the strip seal 606.

Turning now to FIG. 6B, a cross-section 616 of a portion of the stage 602 is depicted. As illustrated, the cover 604 can be supported by the strip seal 606, which can be, in turn, supported by the base 608. For example, the cover 604 can have a notch, lip and/or track that can create a horizontal or nearly horizontal edge (e.g., a slight angle or tapering to allow the strip seal 606 to be decoupled/re-coupled with minimal friction and/or obstruction). Likewise, the base 608 can have an edge that is similarly substantially horizontal to act as a foundation for the strip seal 606. In addition, the strip seal 606 can be magnetically coupled to the base 608 and the cover 604. The magnetic coupling can be achieved by, e.g., inserting magnets 618 in the cover 604 and base 608 that can attract the strip seal 606 when, e.g., the strip seal 606 is comprised of, coated or embedded with, a material that is attracted to the magnets 618, such as a specialized stainless steel, or carbon steel with a coating of chrome, nickel, etc. Additionally or alternatively, the strip seal 606 can be embedded with magnet and/or be coated with a layer or strips of a magnetic material, for example, or the strip seal 606 could be fabricated out of plastic with metal and/or magnetic flakes embedded therein. In the case where a magnetic coupling is not utilized, non-magnetic materials can be employed in connection with the strip seal 606, including but not limited to non-magnetic stainless steel, plastic materials, etc. Moreover, in accordance with other aspects of the claimed subject matter, the strip seal 606 can be electrostatically coupled to the cover 604 and/or the base 608, or coupled by means of an adhesive, e.g., a thin film or layer.

When central members such as a cover plate of a positioning stage begin to sag or vibrate during operation, a number of detrimental effects can result. For example, a sagging cover can create an opening by which contaminants may immigrate into the internal region or the sagging cover can rub or scuff against a slide which can create other debris and/or potential contaminants. Under conditions of vibration, the seal integrity can be compromised and the strip seal might produce debris. In extreme vibration conditions, the life of the seal could be compromised as well. Hence, the strip seal 606 can support the cover 604 to mitigate sagging while the coupling can operate to dampen vibrations in the cover 604.

Figure 7:
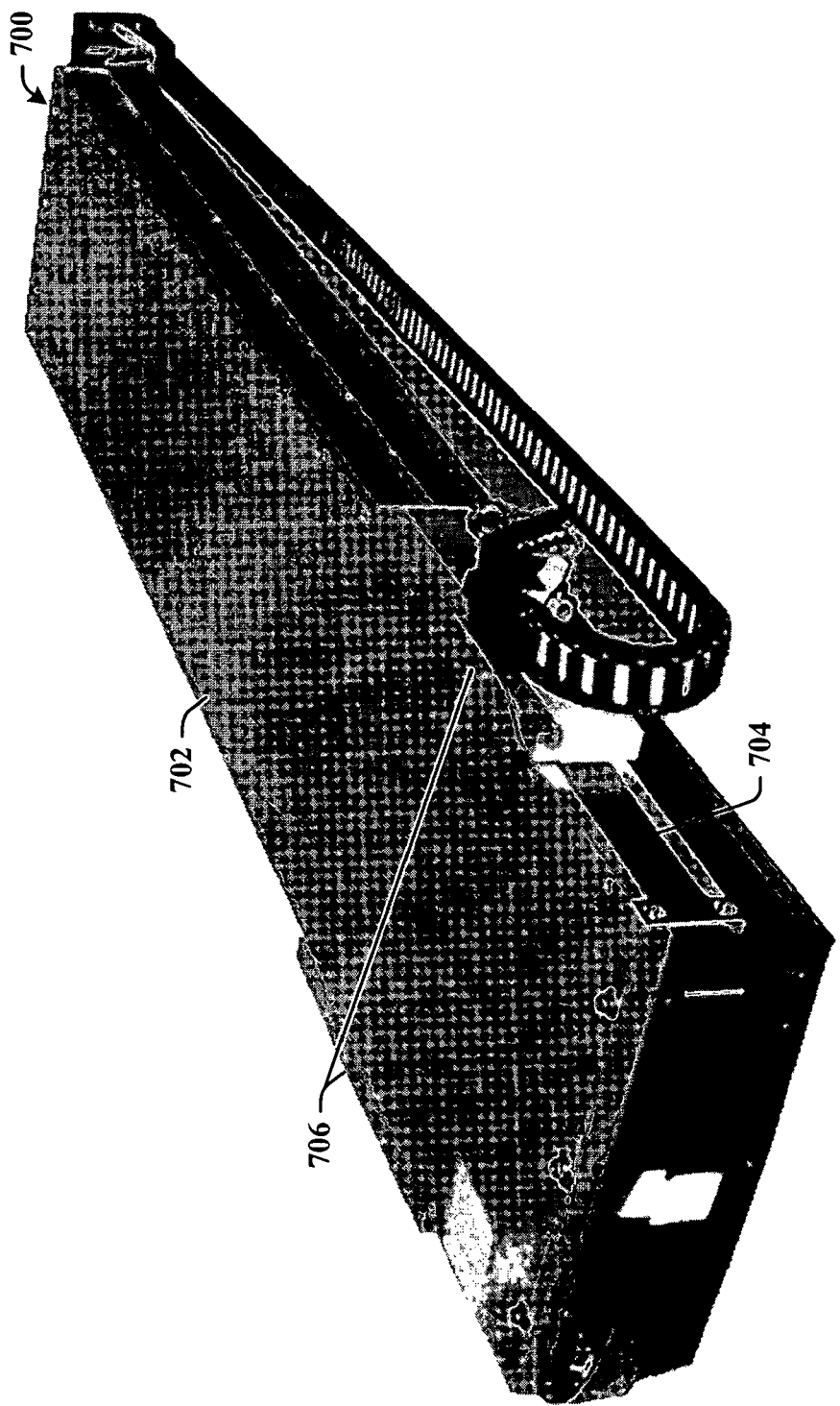
FIG. 7 depicts a model of an exemplary linear positioning stage in accordance with an aspect of the claimed subject matter.

Referring briefly to FIG. 7, a graphic image model of an exemplary linear positioning stage 700 is depicted. The cover 702 of the stage 700 is mounted at the ends and is also supported by the strip seal 704 over the entire travel path, including the middle regions where conventional stages tend to sag. An interior region (not shown) is better protected from potential contaminants because no apertures that can give access to the interior region exist on the top of the stage 700 where the majority of debris will tend to settle. The slides 706 can have a portion that extends in the vertical direction above the cover 702 that can support a platform (not shown) and/or a product or item (not shown) that can travel with the slide 706, elevated above the cover 702.

Figure 8:
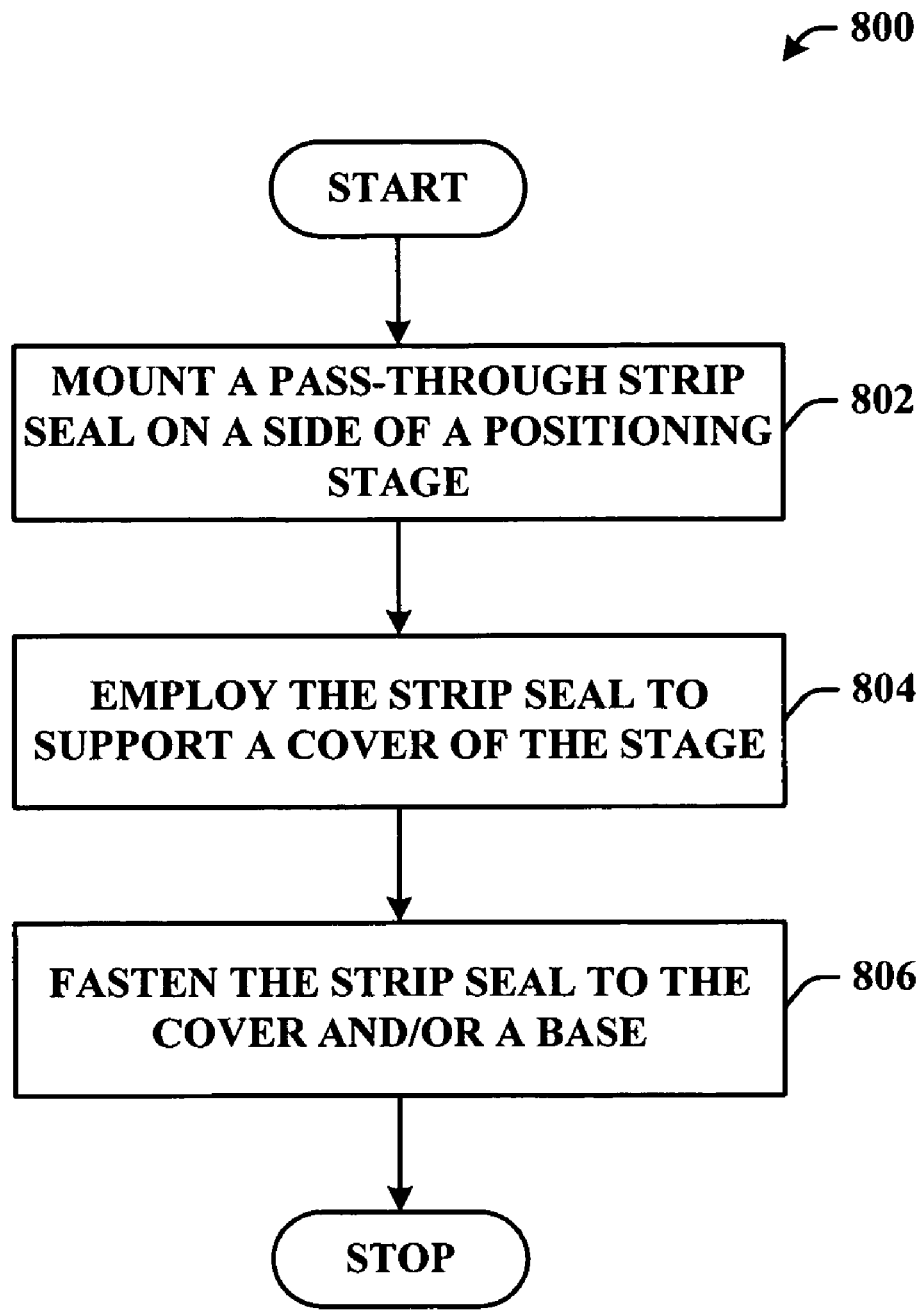
FIG. 8 illustrates an exemplary flow chart of procedures that can enhance performance, efficiency and/or operating life of a positioning stage.

FIG. 8 illustrates methodology 800 in accordance with the present invention. While, for purposes of simplicity of explanation, the one or more methodologies set forth herein are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 8, an exemplary methodology 800 for enhancing performance, efficiency and/or operating life of a positioning stage is shown. At 802, a pass-through strip seal can be mounted on the side of a positioning stage. As detailed supra, mounting the strip seal on the side can reduce the amount of contaminants that gain access to internal components of the stage, and can result in damage to the stage and/or reduce the performance, efficiency, etc. At 804, the strip seal can be employed to support the cover of the stage. For example, the strip seal can fit into a slot or groove between the cover and a base of the stage, e.g., resting upon a ledge of the base and supporting the cover.

At 806, the strip seal can be fastened to the cover and/or the base to reduce vibration of the cover as well as enhancing the integrity or effectiveness of the seal. The fastening can be accomplished by way of a magnetic coupling, an electrostatic coupling and/or an adhesive coupling. For example, magnets can exist in the cover and the base that attract the strip seal or a material in the strip seal. Conversely, the strip seal itself can include magnets or can be coated with a magnetic layer.

Figure 9:
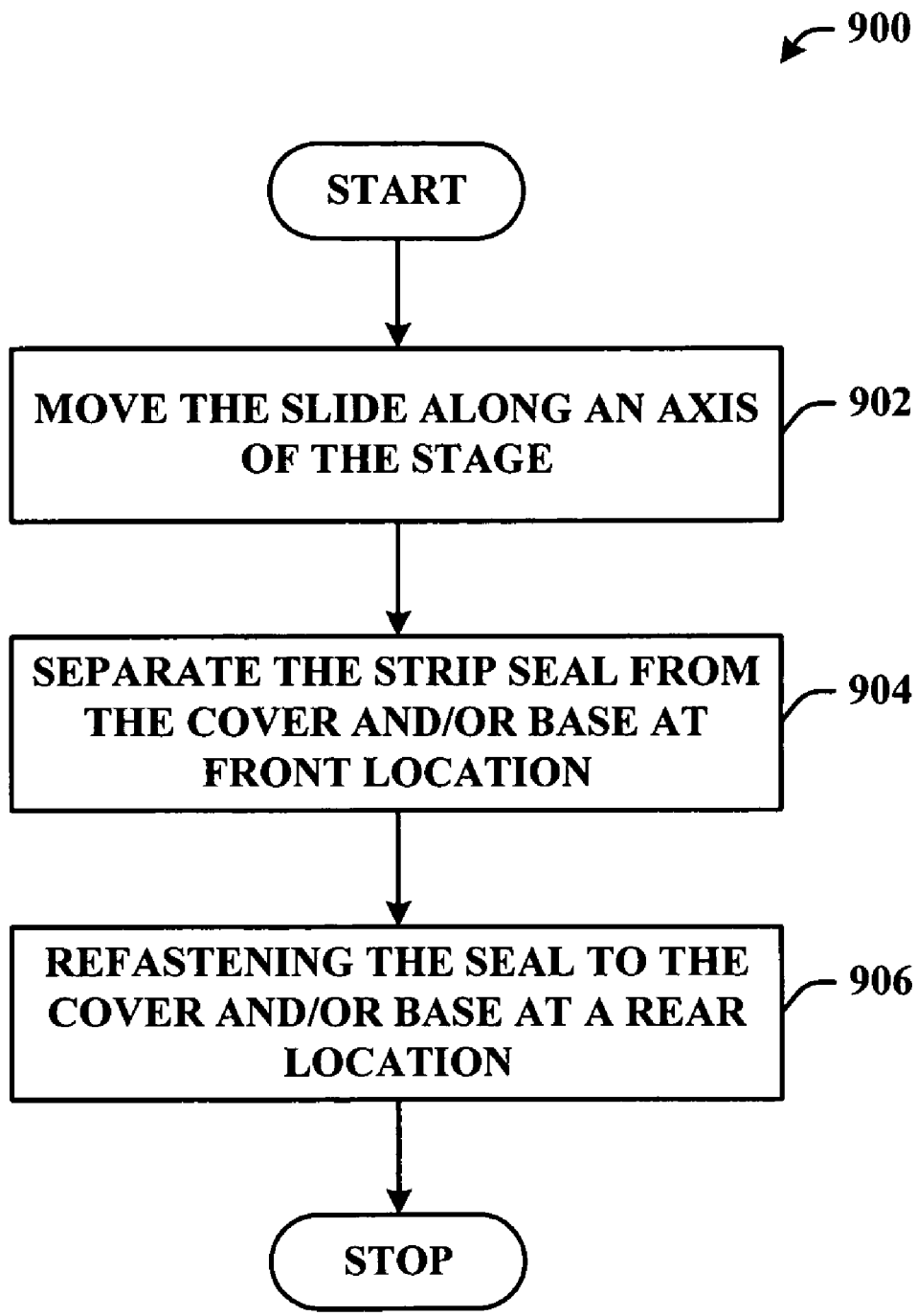
FIG. 9 depicts an exemplary flow chart of procedures that can enhance performance, efficiency and/or operating life of a positioning stage when the slide travels along a path.

With reference now to FIG. 9, an exemplary methodology 900 for enhancing performance, efficiency and/or operating life of a positioning stage when the slide travels along a path is shown. At 902, the slide can move in a direction along an axis of the stage. Typically, the slide will ultimately be propelled by a motor to a desired location (e.g., where work can be done to an item). At 904, the strip seal can be separated from the cover or base as the slide is moved in the direction in accordance with the act 902. At 906, the strip seal on the other side of the slide can be refastened to the cover or base, wherein the fastening can be, e.g., a magnetic coupling. As described above, any of the acts 902-906 can employ rollers or some other means that can be accomplished with suitably low thresholds of friction.

Figure 10:
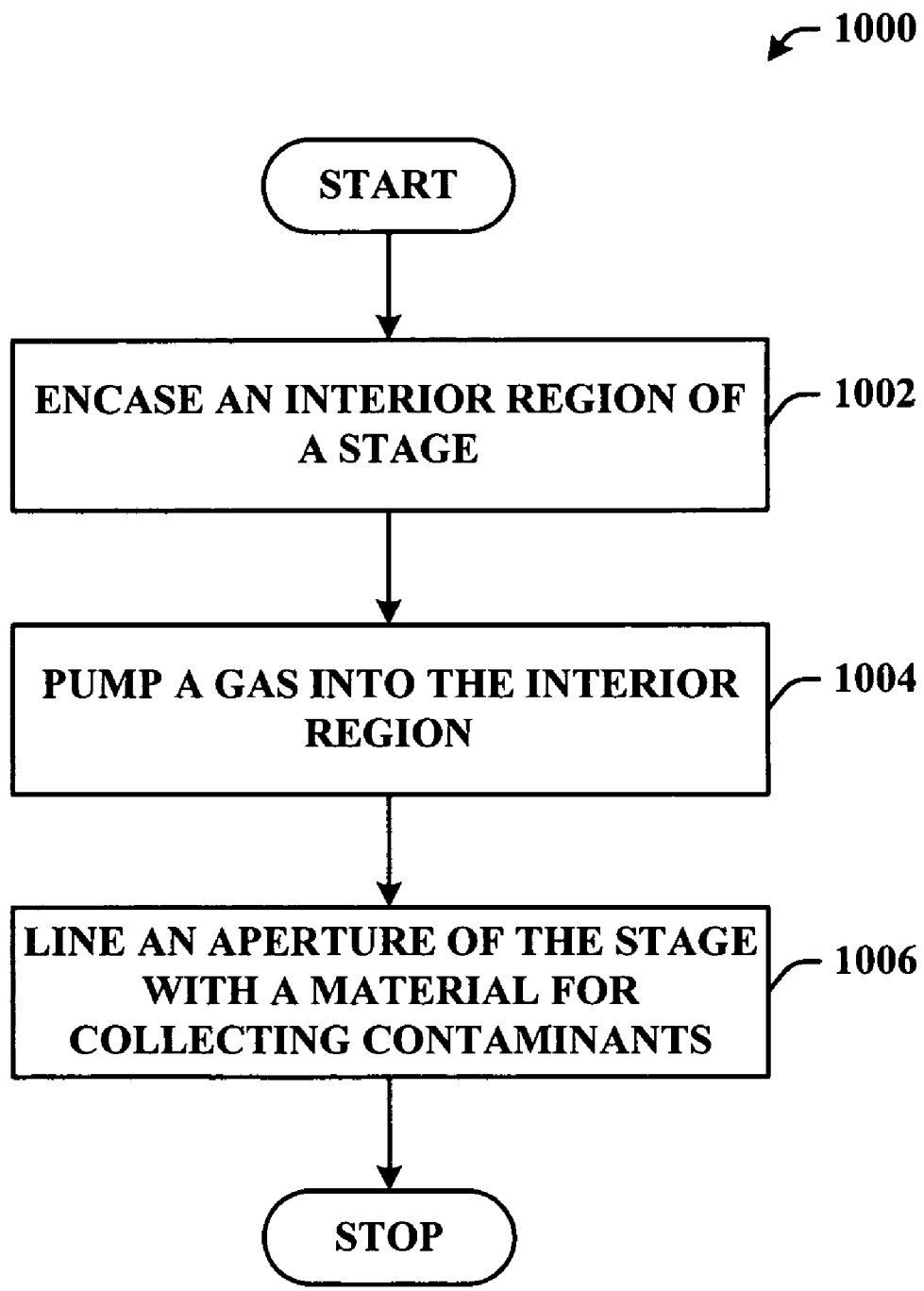
FIG. 10 illustrates an exemplary flow chart of procedures that can enhance performance, efficiency and/or operating life of a positioning stage by further protecting against potential contaminants.

Referring briefly to FIG. 10, an exemplary methodology 1000 for enhancing performance, efficiency and/or operating life of a positioning stage by further protecting against potential contaminants is displayed. At 1002, an interior region of the stage can be encased, for example, by a complete cover, side plates, and base in order to prevent the introduction of contaminants into the interior region. Moreover, at 1004, air and/or gas that is substantially free of contaminants can be pumped into the interior region to, e.g., create a pressure imbalance that can facilitate air flow out of the interior region through any aperture. It is to be understood and appreciated that the air flow can mitigate contamination of the interior region because likely apertures that exist by which potential contaminants may enter will have an outward flowing air current to obstruct this ingress. Additionally or alternatively, at 1006, an aperture can be lined with a material for collecting contaminants, and thus, preventing those contaminants from entering the interior region to cause wear, abrasions and/or other detrimental effects. For example, the material can be a fibrous material such as felt, wool or the like; or the material can be electrostatic that attracts potential contaminants.

What has been described above includes examples of the claimed subject matter. It is, of course, not possible to describe every conceivable combination of components or methodologies for purposes of describing the present invention, but one of ordinary skill in the art may recognize that many further combinations and permutations of the present invention are possible. Accordingly, the claimed subject matter is intended to embrace all such alterations, modifications and variations that fall within the spirit and scope of the appended claims. Furthermore, to the extent that the terms "include" or "includes" are used in either the detailed description or the claims, such terms are intended to be inclusive in a manner similar to the term "comprising" as "comprising" is interpreted when employed as a transitional word in a claim.

What is claimed is:

1. A system that mitigates a tendency of a positioning stage to sag, vibrate and/or accumulate contaminants within the stage, the system comprising:

a cover plate that covers a top of a positioning stage;

a base positioned at a bottom of the stage;

a slide coupled with a strip guide and a platform, the slide operates to move the platform in a direction to a position of the stage; and a strip seal mounted on a side of the stage, the strip seal passes through the slide between the slide and the strip guide.

2. The system of claim 1, the strip seal rests on a substantially horizontal edge of the base and supports a substantially horizontal edge of the cover plate to reduce at least one of sag and vibration.

3. The system of claim 1, the strip seal is magnetically coupled to at least one of the cover plate and the base.

4. The system of claim 3, the strip seal is comprised of a magnetic material that generates a magnetic field.

5. The system of claim 3, the at least one of the cover plate and the base includes a magnet that generates a magnetic field.

6. The system of claim 5, the strip seal is magnetically attracted to the magnet.

7. The system of claim 5, the strip seal is coated with a material that is magnetically attracted to the magnet.

8. The system of claim 5, the strip seal is embedded with a material that is magnetically attracted to the magnet.

9. The system of claim 1, the strip seal is electrostatically coupled to at least one of the cover plate and the base.

10. The system of claim 1, the stage is a linear stage.

11. The system of claim 10, the linear stage is greater than 1 meter in length.

12. The system of claim 1, further comprising a low-friction roller that facilitates movement of the slide, the roller is positioned between at least one of the slide and the cover plate, the slide and the base, the slide and the strip seal, and the strip guide and the strip seal.

13. The system of claim 12, the at least one roller is at least one of a metal roller, a rubber roller and a plastic roller.

14. The system of claim 1, at least one of the slide and the strip guide includes at least one roller.

15. The system of claim 14, the at least one roller operates to lift the strip seal away from the base and the cover plate at a front of the slide, the front of the slide is an end point of the slide that is nearer to the position along an axis of the direction.

16. The system of claim 14, the at least one roller operates to join the strip seal to the base and the cover plate at a back of the slide, the back of the slide is an end point of the slide that is farther from the position along an axis of the direction.

17. The system of claim 1, further comprising an air pressure source that drives air into an interior of the stage to produce an air current that flows out of the stage at an aperture to reduce influx of contaminants into the interior of the stage.

18. The system of claim 1, further comprising an aperture lined with a material that limits access of potential contaminants to an interior of the stage.

19. The system of claim 18, the material is at least one of a fibrous material that collects potential contaminants and an electrostatic material that attracts potential contaminants.

20. The system of claim 19, the fibrous material is at least one of felt, wool and a synthetic material.

21. The system of claim 1, further comprising a fibrous material that sweeps the strip seal to collect potential contaminants.

22. The system of claim 1, the fibrous material lubricates the strip seal.

23. The system of claim 1, the cover plate includes a non-horizontal surface that mitigates accumulation of potential contaminants on the cover plate.

24. The system of claim 1, the non-horizontal surface is at least one of a flat plane and a tapered surface.

25. The system of claim 1, the cover plate and the base extend the length of the stage.

26. The system of claim 25, further comprising two end plates, each of the end plates is mounted to the cover plate and the base at each end of the stage, respectively to enclose an interior region of the stage.

27. The system of claim 26, the interior region includes at least one of a linear motor, a ballscrew, a belt drive, a rack and pinion drive, and a pneumatic actuator that propels the slide to the position.

28. The system of claim 27, further comprising a means for at least one of powering and controlling the motor from an exterior region of the stage.

29. A method for enhancing performance, efficiency and/or operating life of a positioning stage, comprising:

mounting a pass-through strip seal on a side of a positioning stage;

employing the strip seal to support a cover of the stage; and fastening the strip seal to at least one of the cover and a base to reduce vibration of the cover, wherein the fastening is accomplished by way of magnetic field for producing a force of attraction between the strip seal and at least one of the cover and the base.

30. The method of claim 29, further comprising:

moving the slide along an axis of the stage;

employing at least one of the slide and a strip guide for separating the strip seal from at least one of the cover and the base, the separating occurs at an end of the slide as the slide moves; and employing at least one of the slide and the strip guide for refastening the strip seal to at least one of the cover and the base, the refastening occurs at an end of a slide when as slide moves.

31. The method of claim 29, further comprising encasing an interior region of the stage for facilitating a reduction of contaminants in the interior region.

32. The method of claim 31, further comprising pumping uncontaminated air into the interior region for creating an air current that flows out from the interior region at an aperture of the stage.

33. The method of claim 29, further comprising lining an aperture of the stage with a material for collecting contaminants.

34. A pass-through linear positioning stage, comprising:

a means for mounting a strip seal on a side of a pass-through positioning stage;

a means for reducing at least one of sag and vibration in a top cover of the stage;

a means for coupling the strip seal to the top cover and a base of the stage; and a means for reducing contaminants within an interior region of the stage by pumping uncontaminated air into the interior region for creating an air current that flows out from the interior region at an aperture of the stage.

35. The pass-through linear positioning stage of claim 34, wherein the coupling is accomplished by way of magnetic field for producing a force of attraction between the strip seal and at least one of the top cover and the base.

* * * * *